US011576031B2

United States Patent
Puente Pestaña et al.

(10) Patent No.: US 11,576,031 B2
(45) Date of Patent: Feb. 7, 2023

(54) SERVICE REGISTRATION IN A COMMUNICATIONS NETWORK

(71) Applicant: Telefonaktiebolaget LM Ericsson (publ), Stockholm (SE)

(72) Inventors: Miguel Angel Puente Pestaña, Madrid (ES); Maria Cruz Bartolomé Rodrigo, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 169 days.

(21) Appl. No.: 16/753,481

(22) PCT Filed: Oct. 3, 2018

(86) PCT No.: PCT/EP2018/076936
§ 371 (c)(1),
(2) Date: Apr. 3, 2020

(87) PCT Pub. No.: WO2019/076634
PCT Pub. Date: Apr. 25, 2019

(65) Prior Publication Data
US 2020/0296571 A1 Sep. 17, 2020

(30) Foreign Application Priority Data

Oct. 17, 2017 (EP) ..................................... 17382692

(51) Int. Cl.
*H04W 8/18* (2009.01)
*H04L 67/14* (2022.01)
(Continued)

(52) U.S. Cl.
CPC ............... *H04W 8/18* (2013.01); *H04L 67/14* (2013.01); *H04W 88/18* (2013.01)

(58) Field of Classification Search
CPC .......... H04W 8/18; H04W 88/18; H04L 67/14
See application file for complete search history.

(56) References Cited

U.S. PATENT DOCUMENTS 6,098,094 A * 8/2000 Barnhouse .......... H04M 3/4228
709/203
6,134,544 A 10/2000 Glitho et al.
(Continued)

FOREIGN PATENT DOCUMENTS

CN 101925878 A 12/2010
CN 105122936 A 12/2015
(Continued)

OTHER PUBLICATIONS

3rd Generation Partnership Project; Technical Specification Group Core Network and Terminals; 5G System—Phase 1; CT WG4 Aspects (Release 15), 3GPP TR 29.891 V1.0.0 (Sep. 2017).
(Continued)

*Primary Examiner* — Jenee Holland
(74) *Attorney, Agent, or Firm* — Coats & Bennett, PLLC (57) ABSTRACT

In an example aspect, a method for service registration in a communications network is provided. The method comprises receiving a service registration request, the request identifying a network function to provide a service, a type of the service, and a version of the service, and storing information in a repository, the information identifying the network function, the type of the service and the version of the service.

16 Claims, 6 Drawing Sheets

(51) Int. Cl.
  *H04W 88/18* (2009.01)
  *H04L 67/51* (2022.01)
  *H04W 4/50* (2018.01)

(56) References Cited

U.S. PATENT DOCUMENTS

| | | | | |
|---|---|---|---|---|
| 6,438,219 B1* | 8/2002 | Karau | | H04Q 3/005 |
| | | | | 379/112.01 |
| 6,473,502 B1* | 10/2002 | Karau | | H04M 3/42297 |
| | | | | 379/221.13 |
| 6,606,649 B1* | 8/2003 | Schwitters | | G06Q 10/107 |
| | | | | 707/999.01 |
| 7,684,358 B2 | 3/2010 | Kim et al. | | |
| 8,223,682 B2* | 7/2012 | Song | | H04H 40/27 |
| | | | | 370/312 |
| 8,402,111 B2* | 3/2013 | Raleigh | | H04L 67/34 |
| | | | | 709/224 |
| 9,760,923 B1* | 9/2017 | Felstaine | | G06Q 30/0603 |
| 9,825,881 B2 | 11/2017 | Johnston et al. | | |
| 10,587,698 B2* | 3/2020 | Dunbar | | H04L 67/146 |
| 2003/0092438 A1* | 5/2003 | Moore | | H04W 84/025 |
| | | | | 455/423 |
| 2003/0125953 A1 | 7/2003 | Sharma | | |
| 2004/0088695 A1* | 5/2004 | Kawano | | G06F 8/65 |
| | | | | 717/176 |
| 2004/0088696 A1* | 5/2004 | Kawano | | G06F 8/65 |
| | | | | 717/176 |
| 2004/0117358 A1* | 6/2004 | von Kaenel | | G06F 16/00 |
| 2004/0143510 A1 | 7/2004 | Haeberle et al. | | |
| 2005/0149552 A1 | 7/2005 | Chan et al. | | |
| 2006/0026304 A1* | 2/2006 | Price | | G06F 8/65 |
| | | | | 710/8 |
| 2006/0123116 A1 | 6/2006 | Rahman et al. | | |
| 2006/0174252 A1* | 8/2006 | Besbris | | H04L 69/24 |
| | | | | 719/330 |
| 2006/0218291 A1* | 9/2006 | Zhu | | H04L 65/1069 |
| | | | | 709/229 |
| 2007/0002840 A1* | 1/2007 | Song | | H04L 65/1059 |
| | | | | 370/352 |
| 2007/0162478 A1* | 7/2007 | Hall | | H04L 67/16 |
| 2008/0178169 A1* | 7/2008 | Grossner | | H04L 67/16 |
| | | | | 717/170 |
| 2008/0291908 A1 | 11/2008 | Bachmann et al. | | |
| 2008/0301672 A1* | 12/2008 | Rao | | G06F 8/61 |
| | | | | 717/176 |
| 2009/0106350 A1* | 4/2009 | Chen | | G06F 9/54 |
| | | | | 709/203 |
| 2010/0046732 A1* | 2/2010 | James | | H04M 3/42178 |
| | | | | 379/211.01 |
| 2010/0115504 A1* | 5/2010 | Cai | | H04L 61/15 |
| | | | | 717/170 |
| 2010/0161778 A1* | 6/2010 | Guinard | | G06F 11/3093 |
| | | | | 709/224 |
| 2010/0203896 A1* | 8/2010 | Noguchi | | H04W 28/16 |
| | | | | 455/450 |
| 2010/0306757 A1* | 12/2010 | Becker | | G06F 8/71 |
| | | | | 717/170 |
| 2011/0145326 A1* | 6/2011 | Lee | | G06F 9/5038 |
| | | | | 707/769 |
| 2011/0185348 A1 | 7/2011 | Cordesse et al. | | |
| 2012/0011496 A1* | 1/2012 | Shimamura | | G06F 9/44536 |
| | | | | 717/170 |
| 2012/0036041 A1* | 2/2012 | Hesselink | | G06Q 30/0607 |
| | | | | 705/26.25 |
| 2012/0297288 A1 | 11/2012 | Mansouri | | |
| 2012/0317254 A1* | 12/2012 | Chekhanovskiy | | H04L 61/1511 |
| | | | | 709/222 |
| 2013/0036161 A1* | 2/2013 | Chen | | H04W 4/50 |
| | | | | 709/203 |
| 2013/0204907 A1 | 8/2013 | Alonso Alarcon et al. | | |
| 2013/0208716 A1* | 8/2013 | Song | | H04W 8/24 |
| | | | | 370/352 |
| 2013/0346108 A1* | 12/2013 | Kamen | | G16H 40/67 |
| | | | | 705/2 |
| 2014/0279837 A1 | 9/2014 | Guo et al. | | |
| 2014/0344340 A1* | 11/2014 | Tang | | G06F 9/5088 |
| | | | | 709/203 |
| 2014/0351121 A1* | 11/2014 | Vinson | | G06F 21/50 |
| | | | | 705/41 |
| 2014/0351832 A1* | 11/2014 | Cho | | H04L 67/141 |
| | | | | 719/328 |
| 2014/0380388 A1* | 12/2014 | Lee | | H04N 21/2353 |
| | | | | 725/110 |
| 2015/0074259 A1* | 3/2015 | Ansari | | G06F 16/1847 |
| | | | | 709/224 |
| 2015/0089274 A1* | 3/2015 | Mares | | G06F 11/0709 |
| | | | | 714/4.11 |
| 2015/0347683 A1* | 12/2015 | Ansari | | G16H 10/60 |
| | | | | 726/7 |
| 2016/0126775 A1* | 5/2016 | Park | | H02J 7/00034 |
| | | | | 320/108 |
| 2016/0134599 A1 | 5/2016 | Ross et al. | | |
| 2016/0330132 A1* | 11/2016 | Rickey | | G06Q 10/06 |
| 2016/0337172 A1* | 11/2016 | Yu | | H04L 67/34 |
| 2016/0364226 A1* | 12/2016 | Takano | | G06F 9/45558 |
| 2017/0012823 A1 | 1/2017 | Zhu et al. | | |
| 2017/0034015 A1 | 2/2017 | Li et al. | | |
| 2017/0149614 A1* | 5/2017 | Zheng | | H04L 67/12 |
| 2017/0177682 A1* | 6/2017 | Lingamneni | | H04L 67/02 |
| 2017/0180346 A1 | 6/2017 | Suarez et al. | | |
| 2017/0187572 A1* | 6/2017 | Wu | | H04L 41/082 |
| 2017/0208138 A1* | 7/2017 | Baxter | | H04L 41/5054 |
| 2017/0222889 A1* | 8/2017 | Zong | | H04L 41/0897 |
| 2017/0272523 A1* | 9/2017 | Gillis | | H04L 41/5096 |
| 2018/0192390 A1 | 7/2018 | Li et al. | | |
| 2018/0225314 A1 | 8/2018 | Devarao et al. | | |
| 2018/0246757 A1* | 8/2018 | Li | | G06F 9/45558 |
| 2019/0037636 A1 | 1/2019 | Kim et al. | | |
| 2019/0075325 A1* | 3/2019 | Hwang | | H04N 21/2353 |
| 2020/0028921 A1 | 1/2020 | Cai et al. | | |
| 2020/0044957 A1* | 2/2020 | Allan | | H04L 12/185 |
| 2020/0356354 A1* | 11/2020 | Mitra | | G06F 8/36 |
| 2021/0029618 A1* | 1/2021 | Jain | | H04W 48/04 |
| 2022/0037007 A1* | 2/2022 | Nekoomaram | | G06F 8/61 |

FOREIGN PATENT DOCUMENTS

| | | |
|---|---|---|
| JP | 2009218866 A | 9/2009 |
| JP | 2013250952 A | 12/2013 |
| JP | 2017524168 A | 8/2017 |
| JP | 2017529633 A | 10/2017 |
| RU | 2273097 C2 | 3/2006 |
| WO | 2017142362 A1 | 8/2017 |

OTHER PUBLICATIONS

3rd Generation Partnership Project, "3rd Generation Partnership Project; Technical Specification Group Services and System Aspects; System Architecture for the 5G System; Stage 2 (Release 15)", Technical Specification, 3GPP TS 23.501 V1.4.0, Sep. 1, 2017, pp. 1-151, 3GPP.

3rd Generation Partnership Project, "3rd Generation Partnership Project; Technical Specification Group Services and System Aspects; Procedures for the 5G System; Stage 2 (Release 15)", Technical Specification, 3GPP TS 23.502 V1.2.0, Sep. 1, 2017, pp. 1-165, 3GPP.

3rd Generation Partnership Project, "3rd Generation Partnership Project; Technical Specification Group Dore Network and Terminals; User Data Convergence (UDC); Technical Realization and Information Flows; Stage 2 (Release 14)", Technical Specification, 3GPP TS 23.335 V14.0.0, Mar. 1, 2017, pp. 1-39, 3GPP.

China Mobile et al., "23.501: High Level Description of NF Service Registration", SA WG2 #S2-120, Busan, Korea, Mar. 27, 2017, pp. 1-2, S2-171820, 3GPP.

Ericsson, "Pseudo-CR on Services—TS 29.510—NRF", 3GPP TSG CT4 Meeting #80, Kochi, India, Oct. 23, 2017, pp. 1-3, C4-175108, 3GPP.

(56) References Cited

OTHER PUBLICATIONS

China Mobile, "Update the Solution Using NRF Service", 3GPP TSG CT4 Meeting #80, Kochi, India, Oct. 23, 2017 pp. 1-2, C4-175088, 3GPP.

China Mobile et al., "23.501: High Level Description of NF Service Registration", SS WG2 Meeting #S2-120, Busan, Korea, Mar. 27, 2017, pp. 1-2, S2-172852, 3GPP.

Ericsson, "Pseudo-CR on Service Discovery and Registration Using NRF Service", 3GPP TSG CT4 Meeting #79, Krakow, Poland, aug. 21, 2017, pp. 1-5, C4-174083, 3GPP.

Ericsson, "Pseudo-CR on Service Discovery and Registration Using NRF Service", 3GPP TSG CT4 Meeting #79, Krakow, Poland, Aug. 21, 2017, pp. 1-4, C4-174236, 3GPP.

China Mobile, "Discussion on UDM and UDR Interfaces", 3GPP TSG CT4 Meeting #80, Kochi, India, Oct. 23, 2017 pp. 1-3, C4-175076, 3GPP.

Nokia Netqorks, "pCR TR 28.802 Add Use Cases to Support Management for Data Storage Architecture", 3GPP TSG SA WG5 (Telecom Management) Meeting #112, Guilin, China, Mar. 27, 2017, pp. 1-5, S5-171984, 3GPP.

Orange, "Alignment of Date Storage Architecture for Structured Data with TS 23.501 v1.1", 3GPP TSG CT4 Meeting #79, Krakow, Poland, Aug. 21, 2017, pp. 1-5, C4-174053, 3GPP.

Huawei et al., "Description on NF Service Registration", SA WG2 Temporary Document, SA WG2 Meeting #118bis, Spokane, Washington, USA, Jan. 16, 2017, pp. 1-2, S2-170058, 3GPP.

Ericsson, "Pseudo-CR on Service Discovery and Registration using NRF service", 3GPP TSG CT4 Meeting #79, Krakow, Poland, Aug. 21, 2017, pp. 1-4, C4-174332, 3GPP.

ZTE, "Classification and Update of NF Instance Parameters", 3GPP TSG CT4 Meeting #79, Krakow, Poland, Aug. 21, 2017, pp. 1-4, C4-174151, 3GPP.

* cited by examiner

SERVICE REGISTRATION IN A COMMUNICATIONS NETWORK

At least some examples of the present disclosure relate to the technical field of methods and apparatus for service registration in a communications network.

INTRODUCTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The 5th Generation ("5G") System is being developed, documented in references [1] and [2], the contents of which are incorporated herein by reference. The 5G System takes the form of a SBA (Service Based Architecture) including a plurality of Network Functions, where each Network Function (NF) provides one or multiple services (as a producer NF) to one or multiple service consumers (each being a consumer NF). For example, a HTTP/REST (Representational State Transfer using HTTP) Application Programming Interface (API) can be used for interaction between producer services and consumer services. In some cases, a NF may include one or more consumer services and one or more producer services.

Figure 1:
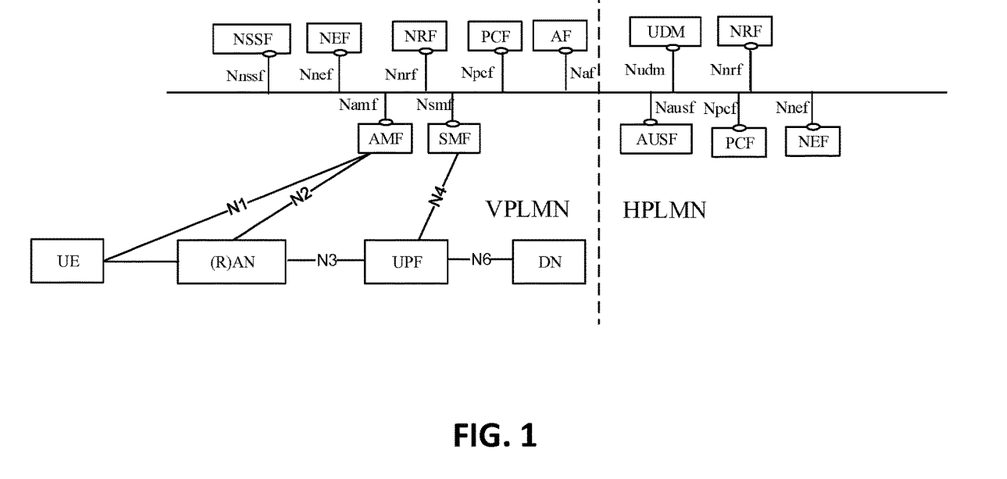
FIG. 1 is a schematic illustration of an example of a roaming 5G system architecture.

FIG. 1 shows an example of a roaming 5G system architecture. In the service based architecture of a 5G system, it is intended that a service provided by a service producer is used (e.g. consumed) by a service consumer. The number of services (or service instances) available in a 5G system is dynamic (due to, for example, scaling up or down, failures, programmed maintenance and/or other factors). The 5G system therefore envisages a Network Repository Function (NRF) that supports functionality including the following:
- NF service registration and deregistration in the NRF;
- discovery of NF services by a NF service consumer; and
- authorization of NF service consumer access to a producer.

Figure 2:
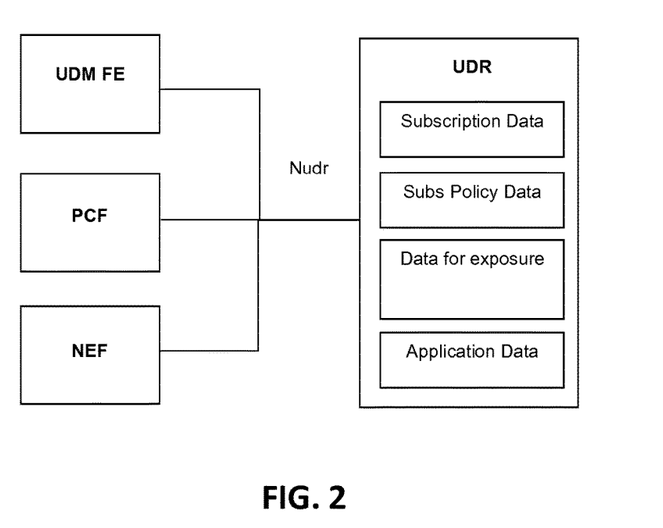
FIG. 2 is a schematic illustration of an example of UDR contents and consumer network functions.

In a 5G architecture such as that shown in FIG. 1, a Unified Data Management (UDM) network function may store subscriber data in a database. In a layered architecture, UDM consists in a UDM Front End (UDM-FE) plus a database. FIG. 2 shows an example of UDR contents and consumer services (e.g. in one or more network functions). As shown, the UDR contains subscription data, subscription policy data, data for exposure and application data, and interfaces via a Nudr interface with UDM-FE, PCF and NEF network functions. The structure shown in FIG. 2 is merely an example and the entities depicted may be organised in a different manner and/or use different interface(s).

The Nudr interface is defined for network functions, such as UDM FE, PCF and NEF, to access a particular view of the data stored and to read, update (including add, modify), and delete data, and to subscribe to notification of changes of relevant data from the UDR. Each Network Function accessing the UDR may be able to add, modify, update or delete only the data it is authorised to change. This authorisation may be performed on a per view and per NF consumer basis and potentially on a per UE, subscription and/or roaming agreement basis by the UDR.

Table 1 below shows an example of services defined for UDM, and related service operations.

TABLE 1

| NF service | Service Operations | Operation Semantics | Example Consumer(s) |
|---|---|---|---|
| Subscriber Data Management | Get | Request/Response | AMF, SMF, SMSF |
| | UpdateSubscribe Request | Subscribe/Notify | AMF, SMF, SMSF |
| | UpdateUnsubscribe | Subscribe/Notify | AMF, SMF, SMSF |
| | UpdateNotification | Subscribe/Notify | AMF, SMF, SMSF |
| UE context management | Registration | Request/Response | AMF, SMF, SMSF |
| | RemoveNotification | Subscribe/Notify | AMF, SMF, SMSF |
| | Deregistration | Request/Response | AMF, SMF, SMSF |
| | Get | Request/Response | NEF |
| | Update | Request/Response | AMF |
| UE Authentication | Request | Request/Response | AUSF |
| EventExposure | Subscribe | Subscribe/Notify | NEF |
| | Unsubscribe | | NEF |
| | Notify | | NEF |

For UDR only one service is defined with related service operations as shown below in Table 2.

TABLE 2

| NF service | Service Operations | Operation Semantics | Example Consumer(s) |
|---|---|---|---|
| Unified Data Management | query | Request/Response | UDM FE, PCF, Provisioning FE, NEF |
| | create | Request/Response | Provisioning FE, NEF |
| | delete | Request/Response | Provisioning FE, NEF |
| | update | Request/Response | Provisioning FE, UDM, FE, PCF, NEF |
| | subscribe | Subscribe/Notify | UDM FE, PCF |
| | notify | | UDM FE, PCF |

NOTE 1:
Whether the data model used by UDR services is standardized or not leaves to stage 3 for decision.
NOTE 2:
As defined in TS 23.335 [11] clause 4.2.2, A Provisioning Front End is an Application Front End for the purpose of provisioning the UDR for subscription data and/or policy data.

Figure 3:
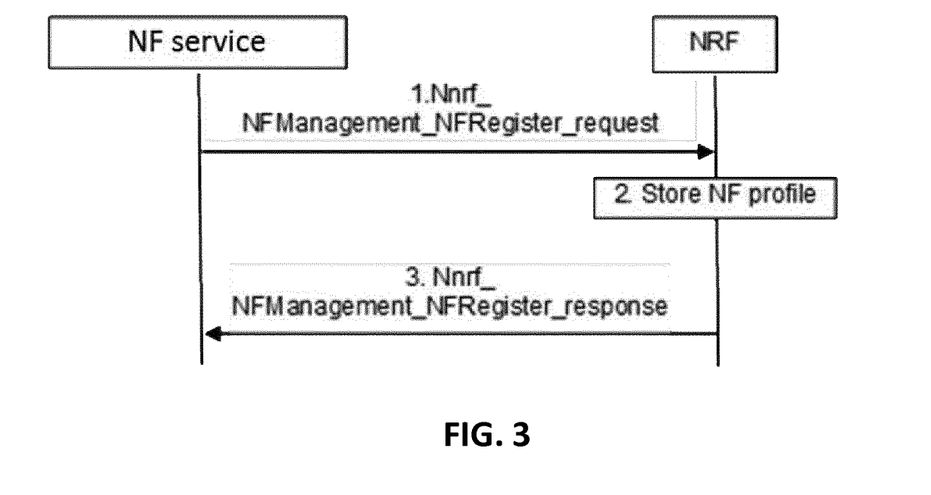
FIG. 3 is an illustration of an example of communications between a NF and NRF for registration of a NF service.

FIG. 3 shows an example of communications between a NF (e.g. NF service, NF service producer) and NRF for registration of a service (e.g. service in a NF, or NF service). In Step 1, the NF service (service producer) sends a service profile (e.g. NF service profile) to the NRF. In step 2, the NRF stores the NF profile. In Step 3, the NRF sends an acknowledgement as a response to the NF (service producer). The terms "NF service" and "NF service profile" may be interchanged with "service" and "service profile".

Figure 4:
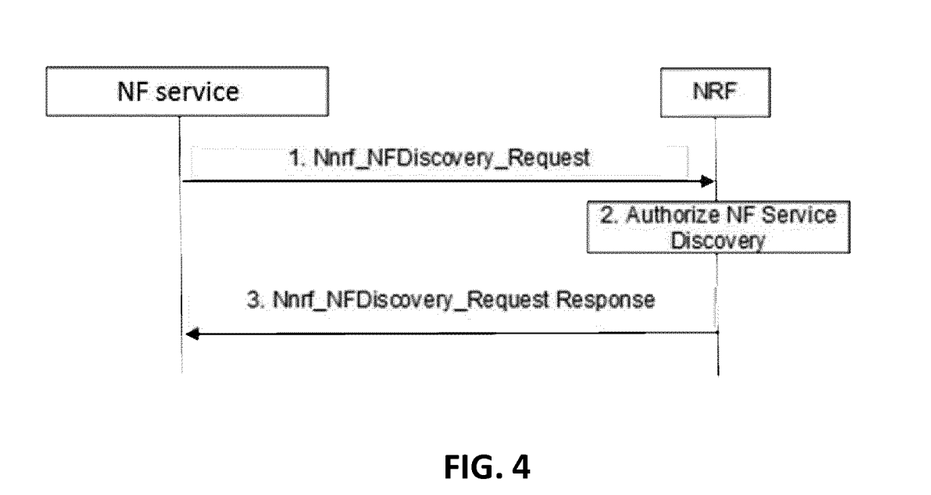
FIG. 4 is an illustration of an example of communications between a NF service and NRF during a service discovery process.

A NF service profile may include the following information:

NF instance ID
NF type
PLMN ID
Network Slice related Identifier(s) e.g. S-NSSAI, NSI ID
FQDN or IP address of NF
NF capacity information
NF Specific Service authorization information
Names of supported services
Endpoint information of instance(s) of each supported service
Other service parameter(s), e.g., DNN, notification endpoint for each type of notification that the NF service is interested in receiving FIG. 4 shows an example of communications between a NF service (NF consumer) and the NRF during a service discovery process. In Step 1, the service consumer (NF service tries to discover the available instances of a particular service in the network. The service consumer sends a discovery request to the NRF indicating:

NF Service Name,
NF Type of the expected NF instance
NF type of the NF consumer
Optionally it may indicate the S-NSSAI.

In step 2, the NRF searches the registered services for those that match the criteria in the discovery request. In Step 3, the NRF replies to the NF with a set of discovered NF instance(s) or NF service instance(s) (for example, these may indicate a FQDN or IP address for each service in the set) that include one, some or all of the services that match the criteria.

Figure 5:
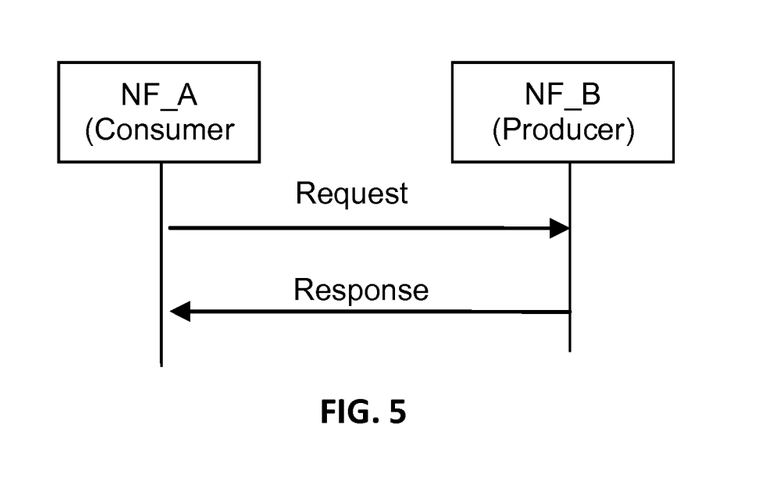
FIG. 5 is an illustration of an example of communications between a NF consumer and NF producer.

FIG. 5 shows an example of communications between a NF consumer and NF producer (e.g. service provider). The interaction between two Network Functions (Consumer and Producer) within this NF service framework follows two mechanisms.

In the first, "Request-response," a Control Plane NF_B (NF Service Producer) is requested by another Control Plane NF_A (NF Service Consumer) to provide a certain NF service, which either performs an action or provides information or both. NF_B provides a NF service based on the request by NF_A. In order to fulfil the request, NF_B may in turn consume NF services from other NFs. In the Request-response mechanism, communication is one to one between two NFs (consumer and producer) and a one-time response from producer to a request from consumer is expected within a certain timeframe.

In the second, "Subscribe-Notify," a Control Plane NF_A (NF Service Consumer) subscribes to NF Service offered by another Control Plane NF_B (NF Service Producer). Multiple Control Plane NFs may subscribe to the same Control Plane NF Service. NF_B notifies the results of this NF service to the interested NF(s) that subscribed to this NF service. The subscription request shall include the notification endpoint (e.g. the notification URL) of the NF Service Consumer to which the event notification from the NF Service Producer should be sent to. In addition, the subscription request may include notification request for periodic updates or notification triggered through certain events (e.g., the information requested gets changed, reaches certain threshold etc.).

A Control Plane NF_A may also subscribe to NF Service offered by Control Plane NF_B on behalf of Control Plane NF_C, i.e. it requests the NF Service Producer to send the event notification to another consumer(s). In this case, NF_A includes the notification endpoint of the NF_C in the subscription request.

SUMMARY

According to an aspect of this disclosure, there is provided a method for service registration in a communications network. The method comprises receiving a service registration request, the request identifying a network function to provide a service, a type of the service, and a version of the service. The method also comprises storing information in a repository, the information identifying the network function, the type of the service and the version of the service.

According to another aspect of this disclosure, there is provided a method for service registration in a communications network. The method comprises sending a service registration request to a service registration network function, the request identifying a service providing network function to provide a service, a type of the service, and a version of the service.

According to a still further aspect of this disclosure, there is provided a computer program comprising instructions which, when executed on at least one processor, cause the at least one processor to carry out a method according to any of the above aspects. Another aspect comprises a carrier that contains the computer program, wherein the carrier comprises one of an electronic signal, optical signal, radio signal or computer readable storage medium. Another aspect comprises a computer program product comprising non transitory computer readable media having stored thereon the computer program.

According to another aspect of this disclosure, there is provided apparatus for service registration in a communications network. The apparatus comprises a receiving module configured to receive a service registration request, the request identifying a network function to provide a service, a type of the service, and a version of the service. The apparatus also comprises a storing module configured to store information in a repository, the information identifying the network function, the type of the service and the version of the service.

According to a still further aspect of this disclosure, there is provided apparatus for service registration in a communications network. The apparatus comprises a sending module configured to send a service registration request to a service registration network function, the request identifying a service providing network function to provide a service, a type of the service, and a version of the service.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

According to some embodiments of this disclosure, the UDR is not a unique entity in a network. For example, there may be multiple UDRs in a network in the following cases:

In customers' deployments, there may be multiple UDRs deployed in the same network, for example, in China where multiple regions are deployed.

Multiple UDRs to hold different data respectively.

Multiple UDRs to provide different services to different service consumers (e.g. PCF, UDM, NEF and/or other consumer(s)).

In these cases, each UDR in a network may register the UDM service in the NRF, but each UDM only serves some specific data, for example subscription data for just a part of all subscribers could be held by a first UDR, while a second UDR may hold the rest of subscribers; or the first UDR could store subscription data just for UDM-FE and PCF, while the second UDR stores Application Data and even a third UDR stores Data for Exposure.

This means that each UDR may register a producer service under the same name (for example, "Unified Data Management"), but it is not possible to identify which data is accessed/served by that instance of the service. As a result, the consumer NF, e.g. UDM-FE, cannot obtain from discovery with the NRF the information to be able to select the UDR service instance that provides access to the data this consumer service is interested in.

The same problem applies to UDM when it stores locally the data (i.e. UDR as an external database is not deployed). If, for example, a UDM stores data for a group or range of subscribers, then UDM consumers (e.g. AMF, SMF, SMSF) do not know which UDM-FE instance stores data for the corresponding UE/subscriber.

In addition, at present it is not specified how service versions are handled, how vendor proprietary service functionality is handled, how vendor proprietary database (for storing any data in the 5G system) functionality is handled, or how service upgrades are handled.

Figure 6:
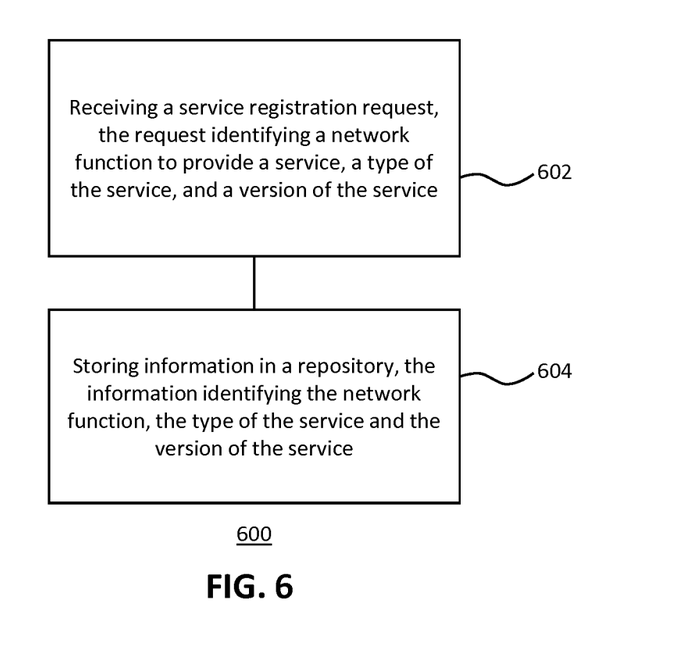
FIG. 6 is a flow chart of an example method for service registration in a communications network.

FIG. 6 is a flow chart of an example method 600 for service registration in a communications network. The method 600 comprises, in block 602, receiving a service registration request, the request identifying a network function to provide a service, a type of the service, and a version of the service, and in block 604, storing information in a repository, the information identifying the network function, the type of the service and the version of the service. Thus, the repository can store information identifying the version of the service, which can be used for various purposes. Also, the version of the service can distinguish the service from previous versions of the service, which may still be registered (e.g. information relating to the previous versions may still be stored in the repository).

The service registration request may be received from the network function. The information may be stored in a Network Repository Function (NRF), and/or the method may be performed by a Network Repository Function (NRF).

In some embodiments, the method includes receiving a service discovery request, the service discovery request identifying the type of service, and sending a service discovery response to a sender of the service discovery request, the service discovery response identifying the network function. The service discovery response may identify the version of the service. The sender of the service discovery request may therefore in some examples be informed of the version of the service, and can act appropriately, for example by using the service if it has a recognised version, using the service if it has a newer version compared to another service of the same type, or using the service if it has an older version (this may avoid using a newer version, which may be incompatible). If the sender of the service discovery request is made aware of multiple services of the same type (e.g. the same service) with different versions, for example in one or more service discovery responses, the sender may compare the versions and select a version to use.

The repository stores further information identifying a further network function, the type of the service and a further version of the service that is a previous version of the service. Therefore, for example, a service of the same type (e.g. the same service) having a different version may also be registered in the repository. The further network function may be the same or a different network function. In some examples, the repository stores information identifying that the version of the service is backwards compatible with the further version of the service. If this information is shared in responses to service discovery requests, for example, then senders of those requests may be made aware of the backwards compatibility, and thus may be able to use newer versions of the service in the same or similar manner to the previous version without losing functionality.

In some examples, the method comprises receiving a plurality of service discovery requests, the service discovery requests identifying the type of service, and, for each service discovery request, sending a service discovery response to a sender of the service discovery request, the service discovery response identifying one of the version of the service and the further version of the service, such that a first subset of the service discovery responses identify the version of the service and a second subset of the service discovery responses identify the further version of the service. This in some examples may achieve load balancing between services. For example, a first set of senders of service discovery requests may be informed of one version of a service, and a second set may be informed of another version of the service, and the sets use the version of the service that they have been informed of (e.g. in service discovery responses). This may be particularly useful when one version of the service is backwards compatible with the other. The version of the service identified in a service discovery response may be selected, for example, in a round-robin fashion, in a random manner, or in any other suitable manner to achieve at least some load balancing between the versions. This example identifies two versions, though there may also be load balancing between three or more versions.

The method may also in some examples comprise, in response to receiving a service discovery request identifying the type of service, and in response to detecting that the version of the service is not operational, sending a service discovery response to a sender of the service discovery request identifying the further version of the service. Therefore, for example, if one version of the service is not operational, the service can still be available from the further version. Where the further version is an earlier or previous version, this may represent a "roll-back" to the further version when the newer or later version becomes non-operational (e.g. if computing entities and/or network connections associated with the newer or later version become unavailable, for example).

The method may also comprise, in response to receiving a service discovery request identifying the type of service, sending a service discovery response to a sender of the service discovery request identifying the version of the service and indicating that the version of the service is backwards compatible with the further version of the service. The information stored in the repository may in some examples indicate a vendor identification for the version of the service and a further vendor identification for the further version of the service, and wherein the service discovery response indicates that the version of the service is backwards compatible with the further version of the service only if the vendor identification is identical to the further vendor identification. This may ensure that a user of a service that may use an earlier or a later version of a service to the one previously used by the user uses another version of the service from the same vendor, which may enhance compatibility.

In some examples, the service registration request indicates that the version of the service is backwards compatible with the further version of the service. Therefore, the backwards compatibility information may be provided, for example, by a provider of the service.

The method may in some embodiments further comprise, in response to a determination that no service discovery requests have been made identifying the further version for a predetermined period of time: informing the further network function that no service discovery requests have been made identifying the further version for the predetermined period of time, and/or removing the further information identifying the further network function, the type of the service and the further version of the service from the repository. Therefore, for example, if the further version (e.g. older or previous version) has not been discovered for the predetermined period of time, it may not have been used for a period of time, and thus may be obsolete (e.g. the later version of the service has been used by service consumers instead). Therefore, appropriate action can be taken; for example, if the network function is thus informed, the network function can for example remove the earlier version of the service; and for example, if the further information is removed from the repository, the repository is kept up to date, and/or the further version of the service will no longer be identified in service discovery requests.

In some examples, the method comprises receiving a further service registration request, the request identifying the further network function to provide the service, the type of the service, and the further version of the service; and storing further information in the repository, the further information identifying the further network function, the type of the service and the further version of the service. Multiple versions of a service can therefore be registered in the repository, for example.

The network function (and/or, where a further network function is present, the further network function) may in some examples be a Unified Data Repository (UDR), Unified Data Management (UDM), Policy Control Function (PCF), Network Exposure Function (NEF) or Access and Mobility Management Function (AMF). The communications network may in some examples be a 5G system.

Figure 7:
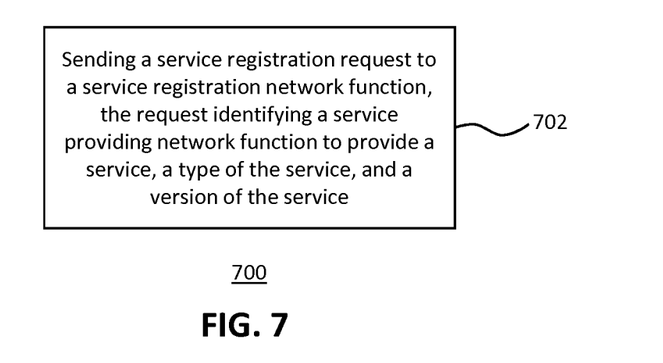
FIG. 7 is a flow chart of a method for service registration in a communications network.

FIG. 7 is a flow chart of a method 700 for service registration in a communications network. The method 700 comprises, in block 702, sending a service registration request to a service registration network function, the request identifying a service providing network function to provide a service, a type of the service, and a version of the service. Thus a service provider (e.g. NF service producer) can register a service along with version information. The service registration network function may be for example, a Network Repository Function (NRF).

In some examples, the method 700 includes sending a further service registration request to the service registration network function, the request identifying a service providing network function to provide a service, the type of the service, and a further version of the service, wherein the further version of the service is a subsequent version of the service to the version of the service. Therefore, for example, multiple versions of the service can be registered. The further service registration request may indicate whether the subsequent version of the service is backwards compatible with the version of the service. The further service registration request may identify the version of the service that is the previous version of the service, and/or the service registration request indicates a vendor identification for the version of the service, and the further service registration request indicates the vendor identification for the further version of the service.

The method 700 may in some examples be performed by a network function service producer. The network function service producer may for example comprise a Unified Data Repository (UDR), Unified Data Management (UDM), Policy Control Function (PCF), Network Exposure Function (NEF) or Access and Mobility Management Function (AMF).

Figure 8:
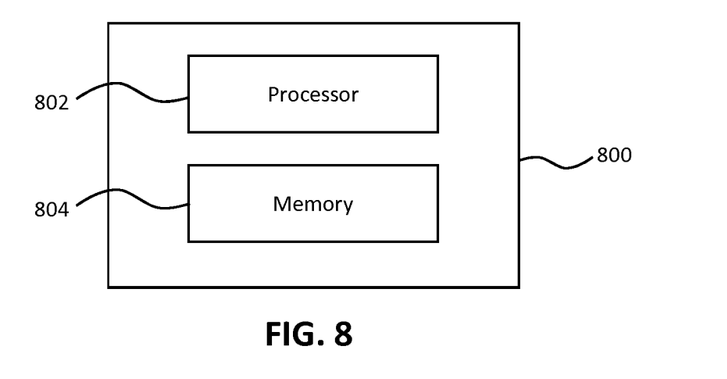
FIG. 8 is a schematic illustration of an example of apparatus for service registration in a communications network.

FIG. 8 is a schematic illustration of an example of apparatus 800 for service registration in a communications network. The apparatus 800 comprises a processor 802 and a memory 804. The memory 804 contains instructions executable by the processor 802 such that the apparatus is operable to perform, for example, the method 600 shown in FIG. 6.

Figure 9:
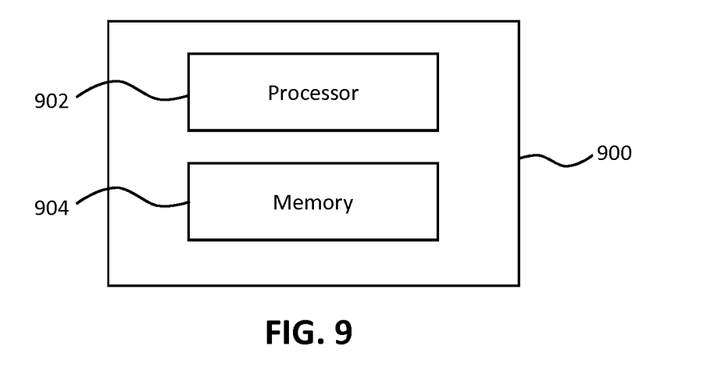
FIG. 9 is a schematic illustration of an example of apparatus for service registration in a communications network.

FIG. 9 is a schematic illustration of an example of apparatus 900 for service registration in a communications network. The apparatus 900 comprises a processor 902 and a memory 904. The memory 904 contains instructions executable by the processor 902 such that the apparatus is operable to perform, for example, the method 700 of FIG. 7.

Figure 10:
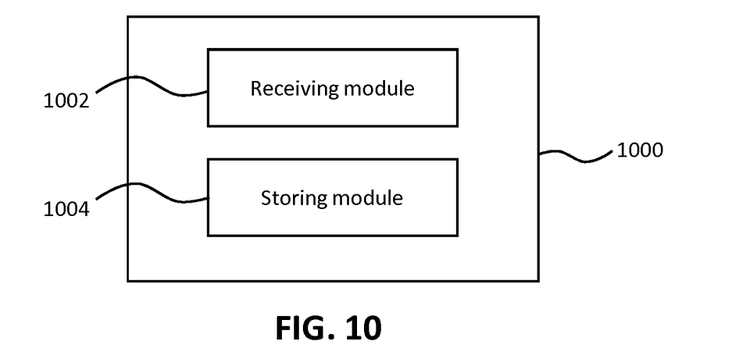
FIG. 10 is a schematic illustration of an example apparatus for service registration in a communications network.

FIG. 10 is a schematic illustration of an example apparatus 1000 for service registration in a communications network. The apparatus 1000 comprises a receiving module 10020 configured to receive a service registration request, the request identifying a network function to provide a service, a type of the service, and a version of the service. The apparatus 1000 also comprises a storing module 1004 configured to store information in a repository, the information identifying the network function, the type of the service and the version of the service.

Figure 11:
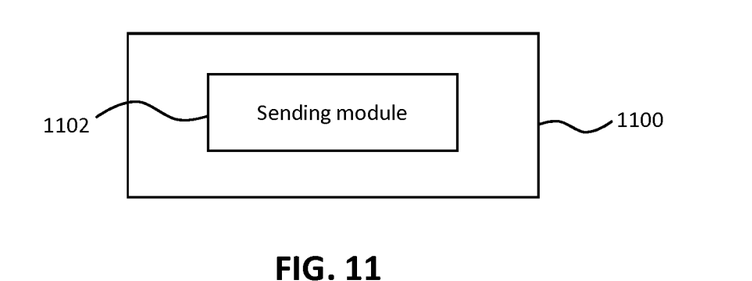
FIG. 11 is a schematic illustration of an example apparatus for service registration in a communications network.

FIG. 11 is a schematic illustration of an example apparatus 1100 for service registration in a communications network. The apparatus 1100 comprises a sending module 1102 configured to send a service registration request to a service registration network function, the request identifying a service providing network function to provide a service, a type of the service, and a version of the service.

Further embodiments of the present disclosure will now be described.

Embodiments of the present disclosure provide a manner to handle service versions, vendor proprietary functionality and/or service upgrades in a SBA such as for example in a 5G System. For example, each of the following is proposed:

1. To include in the NF profile registered in a NRF the vendor ID and service version of each registered NF service. Therefore, this information is also included in the NF service registration request, e.g. from a NF service producer;
2. To indicate to NRF (e.g. in a service registration request, another communication, or some other manner) whether a new service version obsoletes a previous one;
3. To indicate to NRF (e.g. in a service registration request, another communication, or some other manner) whether a new service version is backwards compatible with the previous one;
4. NRF to indicate in a service discovery response whether there are available service instances of a newer version (e.g. for a certain vendor ID), so the sender of a corresponding service discovery request (e.g. NF service consumer) is aware of new service versions and can start using the new service version;
5. NRF to execute discovery methods/processes (e.g. send discovery request responses) based on the service version to:
   A. Load balance discovery requests among compatible (e.g. backwards compatible) service versions;
   B. Perform service version rollbacks. NRF discovers the instances of a new service version following a certain progressive model (e.g. linear, stepped, etc.), so that if the new version fails, a rollback can be made to a previous version without compromising the overall system operation; and/or
6. NRF to notify (e.g. to a NF service consumer or NF service producer) when a certain service version is obsolete because no discovery requests have been received during a period of time, or no discovery responses identify that version during a period of time.

Embodiments disclosed herein may entail one or more of the following advantages:

Allows handling of service versions and service upgrades in a SBA, e.g. 5G System. For example, a service may be upgraded due to bug corrections or improved resource efficiency.

Allows support of and access to vendor proprietary functionality. Service consumers can discover services of a specific vendor and version with proprietary functionality, e.g. with new input/output parameters than those present in (for example) a Technical Specification.

Allows coexistence of different service versions.
   E.g. when only a few instances of a new service version are introduced, a load balancing method between the old and new version can be applied in order not to overload the new version instances.

Allows progressive service upgrades. The service instances of the new version are discovered progressively. If the new version fails, a quick rollback can be done to the old version without compromising the overall system operation.

Automated consumer awareness of new versions. Consumers can be notified of new service versions upon service discovery, so that they can automatically request newer versions of the service.

Figure 12:
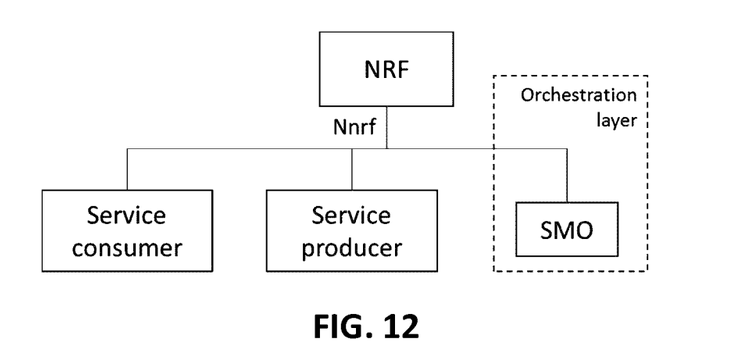
FIG. 12 is a schematic illustration of an example of entities and interfaces involved in certain embodiments.

FIG. 12 is a schematic illustration of an example of entities and interfaces involved in certain embodiments. Service Management and Orchestration (SMO) is an entity proposed in embodiments disclosed herein that may be hosted in the network management and orchestration layer. NRF and SMO may interact through the Noam interface.

Figure 13:
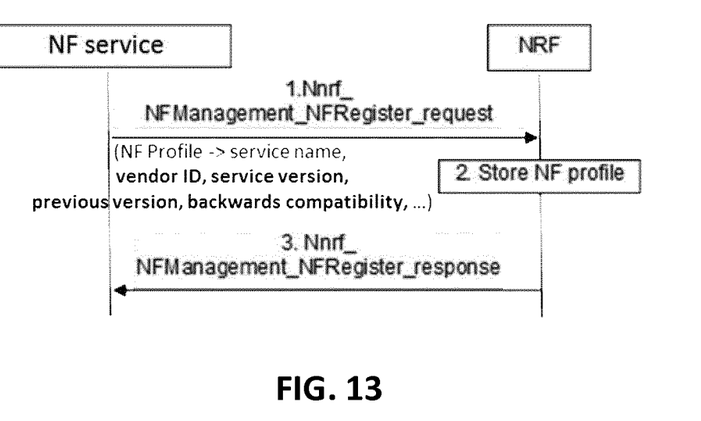
FIG. 13 is an illustration of an example of communications between a NF service and NRF during a service registration process.

FIG. 13 is an illustration of an example of communications between a NF service and NRF during a service registration process. Embodiments disclosed herein, such as that shown in FIG. 13, propose to (optionally) include in the service registration request one or more of the following information per service instance:

Vendor ID—standardized identifier of a vendor.

Service version—It can be a standardized notation or be vendor-specific with a standard length.

Previous version—Version that precedes the new version. It shall follow the same notation type as the service version.

Backwards compatibility—indicator of whether the new version is backwards compatible with the previous one.

From this information the NRF can construct a view of the hierarchy of versions for the different services and vendors, and have a view on which versions are compatible among them.

Figure 14:
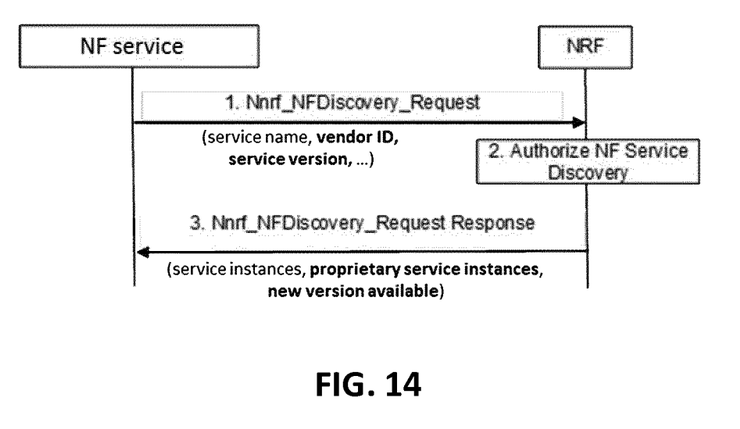
FIG. 14 is an illustration of an example of communications between a NF service and NRF during a service discovery process.

FIG. 14 is an illustration of an example of communications between a NF service and NRF during a service discovery process. Embodiments disclosed herein propose to (optionally) include in a service discovery request (e.g. as illustrated in FIG. 14) one or more of the following information:

Vendor ID—standardized identifier of a vendor.

Service version—It can be a standardized notation or be vendor-specific with a standard length.

This may allow a NF service consumer to discover service instances of a certain vendor and version.

Embodiments disclosed herein propose to include one or more of the following information in the discovery response, for example in all cases or in the case where service instances of the requested vendor and version do exist in the system:

Proprietary service instances list—List of service instances of the requested vendor and version. This list is differentiated from the regular list of service instances that do not have any vendor or version registered.

The service consumer may send a discovery request for a version that is not the most recent on the system. Embodiments disclosed herein propose to (optionally) include in the service discovery response the following information:

New version available—an indication that a more recent version of the requested service is available. The indication may be sent along with the response so that the service consumer can discover the new version from that time on.

NRF may decide when to send this indication. For example, even if there is a new service version available it may omit this notification due to load balance purposes, lack of backwards compatibility, operator's policies and/or any other reason.

When deploying a new service version, it may be a good practice to start allowing discovery of the new service instances progressively so that any failure of the new version can be mitigated by a rollback to the previous version. Other upgrade methods may also be applied. To that extent, embodiments disclosed herein propose a new facility (e.g. service) for the NRF to configure and start a service upgrade and command a rollback to the previous version if needed. Table 3 below shows an example service that may achieve this along with service operations.

TABLE 3

| Service Name | Service Operations | Operation Semantics |
| --- | --- | --- |
| Nnrf_ServiceUpgrade | Start | Request/Response |
| | Rollback | Request/Response |

In an example, it is assumed that prior to the start operation (illustrated in Table 3) one or more instances of a new service version are already registered with NRF. The Start request message (i.e. Start service operation request) may include one or more of the following information/parameters:

Service name

Vendor ID

Service version (e.g. new version)

Type of upgrade—defines the model by which NRF discovers the instances of the new service version.

Parameters for each type of upgrade—defines the parameters related to the type of service upgrade. E.g. slope for linear, steps and duration for a stepped upgrade, etc.

The Start response message may be an acknowledgement of the Start request message from NRF.

In an event that the new service version fails, a Rollback request message may be sent to NRF either by the NF hosting the service or the O&M system (SMO module). This may include one or more of the following parameters:

Service name

Vendor ID

Service version

Rollback type—different rollback types can be defined. E.g. full rollback (only the old version is discovered from that point on), partial rollback (keep a subset of the new versions discoverable), etc.

The Rollback response message may be an acknowledgement of the Rollback request message from NRF.

Once a new service version has been deployed and the upgrade has been completed successfully, in some embodiments, service consumers should no longer discover the old version of the service. NRF may detect this situation when there are no further discovery requests for the old version during a certain period. This can be useful e.g. for the orchestration layer to remove the service instances of the obsolete version. Embodiments disclosed herein propose a service operation in NRF to notify about service obsolescence. This service operation can be part of the above "service upgrade" service (e.g. Nnrf_ServiceUpgrade) in NRF or be part of a different service. In one example, it is part of the "service upgrade" service, as illustrated in Table 4 below:

TABLE 4

| Service Name | Service Operations | Operation Semantics |
| --- | --- | --- |
| Nnrf_ServiceUpgrade | Obsolescence | Subscribe/Notify |

The entity that desires to be notified of the service obsolescence may in some examples subscribe to this operation in NRF and wait for the NRF to send such notification. The Obsolescence subscribe message may include one or more of the following information/parameters:

Service name

Vendor ID

Service version—the one in use. The one the subscribing entity wants to be notified about in the case it has become obsolete.

Time period—period of time in which the indicated service version receives no discovery requests to be considered obsolete.

The Obsolescence notify message may include an indication of service obsolescence (e.g. of a particular version, which may also be indicated) to the subscribing entity.

It should be noted that the above-mentioned examples illustrate rather than limit the embodiments disclosed herein, and that those skilled in the art will be able to design many alternative examples. The word "comprising" does not exclude the presence of additional elements or steps, "a" or "an" does not exclude a plurality, and a single processor or other unit may fulfil the functions of several units. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in statements shall not be construed so as to limit their scope.

The invention claimed is:

1. A method for service registration and discovery in a communications network, the method comprising:
   receiving a service registration request; the request identifying a network function to provide a service, a type of the service, and a version of the service;
   storing information in a repository, the information identifying the network function, the type of the service, and the version of the service;
   receiving a further service registration request, the further service request identifying the further network function to provide the service, the type of the service, and the further version of the service; and
   storing further information in the repository, the further information identifying the further network function, the type of the service, and the further version of the service, wherein the further version is a previous version of the service;
   receiving a service discovery request, the service discovery request identifying the type of service; and
   sending a service discovery response to a sender of the service discovery request, the service discovery response identifying the network function and the version of the service.

2. The method of claim 1, wherein the repository stores information identifying that the version of the service is backwards compatible with the further version of the service.

3. The method of claim 2, wherein the service registration request indicates that the version of the service is backwards compatible with the further version of the service.

4. The method of claim 2, further comprising, in response to a determination that no service discovery requests have been made identifying the further version for a predetermined period of time:
   informing the further network function that no service discovery requests have been made identifying the further version for the predetermined period of time; and/or
   removing the further information identifying the further network function, the type of the service, and the further version of the service from the repository.

5. The method of claim 2, further comprising:
   receiving a plurality of service discovery requests, the service discovery requests identifying the type of service; and
   for each service discovery request, sending a service discovery response to a sender of the service discovery request, the service discovery response identifying one of the version of the service and the further version of the service, such that a first subset of the service discovery responses identify the version of the service and a second subset of the service discovery responses identify the further version of the service.

6. The method of claim 2, further comprising, in response to receiving a service discovery request identifying the type of service, and in response to detecting that the version of the service is not operational, sending a service discovery response to a sender of the service discovery request identifying the further version of the service.

7. The method of claim 2, further comprising, in response to receiving a service discovery request identifying the type of service, sending a service discovery response to a sender of the service discovery request identifying the version of the service and indicating that the version of the service is backwards compatible with the further version of the service.

8. The method of claim 7:
   wherein the information stored in the repository indicates a vendor identification for the version of the service and a further vendor identification for the further version of the service; and
   wherein the service discovery response indicates that the version of the service is backwards compatible with the further version of the service only if the vendor identification is identical to the further vendor identification.

9. A method for service registration in a communications network, the method comprising:
   sending a service registration request to a service registration network function; the request identifying a service providing network function to provide a service, a type of the service, and a version of the service;
   sending a further service registration request to the service registration network function; the further service registration request identifying a service providing network function to provide a service, the type of the service, and a further version of the service; and
   wherein the further version of the service is a subsequent version of the service to the version of the service.

10. The method of claim 9, wherein the further service registration request indicates whether the subsequent version of the service is backwards compatible with the version of the service.

11. The method of claim 9, wherein the further service registration request identifies the version of the service that is the previous version of the service.

12. The method of claim 9:
   wherein the service registration request indicates a vendor identification for the version of the service; and
   wherein the further service registration request indicates the vendor identification for the further version of the service.

13. The method of claim 9, further comprising receiving a notification that that no service discovery requests have been made identifying the version of the service for a predetermined period of time.

14. The method of claim 13, wherein the notification indicates that information identifying the network function, the type of the service, and the version of the service has been removed from the repository.

15. An apparatus for service registration and discovery in a communications network, the apparatus comprising:
   processing circuitry;
   memory containing instructions executable by the processing circuitry whereby the apparatus is operative to:
      receive a service registration request; the request identifying a network function to provide a service, a type of the service, and a version of the service;
      store information in a repository, the information identifying the network function, the type of the service, and the version of the service;
      receiving a further service registration request, the further service request identifying the further network function to provide the service, the type of the service, and the further version of the service; and
      storing further information in the repository, the further information identifying the further network function, the type of the service, and the further version of the service, wherein the further version is a previous version of the service;
      receive a service discovery request, the service discovery request identifying the type of service; and
      send a service discovery response to a sender of the service discovery request, the service discovery response identifying the network function and the version of the service.

16. An apparatus for service registration in a communications network, the apparatus comprising:
   processing circuitry;
   memory containing instructions executable by the processing circuitry whereby the apparatus is operative to:
   send a service registration request to a service registration network function, the request identifying a service providing network function to provide a service, a type of the service, and a version of the service;
   send a further service registration request to the service registration network function; the further service registration request identifying a service providing network function to provide a service, the type of the service, and a further version of the service; and
   wherein the further version of the service is a subsequent version of the service to the version of the service.

* * * * *

UNITED STATES PATENT AND TRADEMARK OFFICE
CERTIFICATE OF CORRECTION

PATENT NO. : 11,576,031 B2
APPLICATION NO. : 16/753481
DATED : February 7, 2023
INVENTOR(S) : Puente Pestaña et al.

It is certified that error appears in the above-identified patent and that said Letters Patent is hereby corrected as shown below:

In the Claims

In Column 14, Line 14, in Claim 6, delete "a service discovery request" and insert -- the service discovery request --, therefor.

In Column 14, Line 20, in Claim 7, delete "a service discovery request" and insert -- the service discovery request --, therefor.

In Column 14, Line 63, in Claim 13, delete "that that" and insert -- that --, therefor.

Signed and Sealed this
Eleventh Day of July, 2023

Katherine Kelly Vidal
*Director of the United States Patent and Trademark Office*